United States Patent
Fleischel et al.

(10) Patent No.: US 11,059,749 B2
(45) Date of Patent: Jul. 13, 2021

(54) ASPHALT COMPOSITION COMPRISING THERMOSETTING REACTIVE COMPOUNDS

(71) Applicant: BASF SE, Ludwigshafen am Rhein (DE)

(72) Inventors: Olivier Fleischel, Ludwigshafen am Rhein (DE); Iran Otero Martinez, Lemfoerde (DE); Waldemar Schatz, Lemfoerde (DE); Dag Wiebelhaus, Ludwigshafen am Rhein (DE); Berend Eling, Lemfoerde (DE); Dietrich Scherzer, Ludwigshafen am Rhein (DE); Jens Ferbitz, Antwerp (BE); Michael Praw, Wyandotte, MI (US); Bernie Lewis Malonson, Wyandotte, MI (US); Ryan E. Taylor, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/621,126

(22) PCT Filed: Jun. 4, 2018

(86) PCT No.: PCT/EP2018/064602
§ 371 (c)(1),
(2) Date: Dec. 10, 2019

(87) PCT Pub. No.: WO2018/228840
PCT Pub. Date: Dec. 20, 2018

(65) Prior Publication Data
US 2020/0199025 A1    Jun. 25, 2020

(30) Foreign Application Priority Data

Jun. 14, 2017    (EP) .................................... 17175976

(51) Int. Cl.
*C04B 26/26* (2006.01)
*C08L 95/00* (2006.01)
*C04B 103/00* (2006.01)

(52) U.S. Cl.
CPC .............. *C04B 26/26* (2013.01); *C08L 95/00* (2013.01); *C04B 2103/0067* (2013.01)

(58) Field of Classification Search
CPC ......... C08L 95/00; C08L 95/005; C04B 26/26
See application file for complete search history.

(56) References Cited

U.S. PATENT DOCUMENTS

2010/0056674 A1 *  3/2010  Morifusa ................ C08L 95/00
                                                       524/68

FOREIGN PATENT DOCUMENTS

| EP | 0537638 B1    | 8/1995 |
| EP | 3006525 A1    | 4/2016 |
| WO | WO-0130911 A1 | 5/2001 |
| WO | WO-0130912 A1 | 5/2001 |
| WO | WO-0130913 A1 | 5/2001 |

OTHER PUBLICATIONS

International Search Report for PCT/EP2018/064602 dated Sep. 19, 2018.
Written Opinion of the International Searching Authority for PCT/EP2018/064602 dated Sep. 19, 2018.

* cited by examiner

*Primary Examiner* — Christopher M Rodd
(74) *Attorney, Agent, or Firm* — Faegre Drinker Biddle & Reath LLP

(57) ABSTRACT

An asphalt composition comprising 0.1 to 10.0 wt.-% based on the total weight of the composition of a thermosetting reactive compound selected from the group consisting of polymeric MDI, epoxy resins and melamine formaldehyde resins, wherein at least 18% by weight based on the total weight of the composition are particles with a sedimentation coefficient above 5000 Sved in a white spirit solvent.

14 Claims, No Drawings

ASPHALT COMPOSITION COMPRISING THERMOSETTING REACTIVE COMPOUNDS

CROSS-REFERENCE TO RELATED APPLICATIONS

This application is a national stage application (under 35 U.S.C. § 371) of PCT/EP2018/064602, filed Jun. 4, 2018, which claims benefit of European Application No. 17175976.4, filed Jun. 14, 2017, both of which are incorporated herein by reference in their entirety.

This invention essentially relates to an asphalt composition comprising thermosetting reactive compounds as asphalt modifier from the group consisting of polymeric MDI, epoxy and melamine formaldehyde wherein at least 18% by weight based on the total weight of the composition are particles with a sedimentation coefficient above 5000 Sved in a white spirit solvent.

The present invention also relates to a process for the preparation of an asphalt composition. The asphalt composition of the present invention shows an increase in the functional temperature range and improved deformation resistance properties of the asphalt as for example the useful temperature range of the asphalt, increased elasticity and a lower potential of deformation.

In general asphalt is a colloidal material containing different molecular species classified into asphaltenes and maltenes. Asphalt being viscoelastic and thermoplastic suffers property variation over a range of temperatures, from extreme cold to extreme heat. Asphalt tends to soften in hot weather and crack in extreme cold. At cold temperatures, asphalts become brittle and are subject to crack while at elevated temperatures they soften and lose physical properties.

The addition of a thermosetting reactive component as binders respectively in more general terms as modifier allows the physical properties of the asphalt to remain more constant over a range of temperatures and/or improve the physical properties over the temperature range the asphalt is subjected to.

Such asphalts that are modified by added binders respectively modifiers are known for years in the state of the art. But there is still a need in the asphalt industry, however, for improved asphalts. In part this is because currently known polymer-modified asphalts have a number of deficiencies. These include susceptibility to for instance permanent deformation (rutting), flexural fatigue, moisture, decrease of elasticity at low temperature operation.

WO 01/30911 A1 discloses an asphalt composition comprising, by weight based on the total weight of the composition, about 1 to 8%, of a polymeric MDI, where the polymeric MDI has a functionality of at least 2.5. It also relates to a process for preparing said asphalt composition, using reaction times of below 2 hours. The formation of the product MDI-asphalt is measured by an increase in the products viscosity or more preferably by dynamic mechanical analysis (DMA).

WO 01/30912 A1 discloses an aqueous asphalt emulsion comprising, besides asphalt and water, an emulsifiable polyisocyanate. It also relates to an aggregate composition comprising said emulsion, and to processes for preparing said compositions WO 01/30913 A1 discloses an asphalt composition comprising, by weight based on the total weight of the composition, about 1 to 5%, of a polymeric MDI based prepolymer, where the polymeric MDI has a functionality of at least 2.5. It also relates to a process for preparing said asphalt composition.

EP 0 537 638 B1 discloses polymer modified bitumen compositions which contain 0.5 to 10 parts by weight of functionalized polyoctenamer to 100 parts by weight of bitumen and, optionally, crosslinking agents characterized in that the polyoctenamer is predominantly a trans-polyoctenamer and contains carboxyl groups, as well as groups derived therefrom for example maleic acid.

Consequently, it would be highly desirable to have an asphalt composition and a related preparation process at hand which could avoid all the disadvantages associated with the prior art, for example limited useful temperature interval, limited elastic response and low softening point.

One of the objects of the present invention was to provide an asphalt composition showing improved physical properties in terms of being more constant over a range of temperatures. Furthermore, an asphalt composition was sought that shows an increase in the useful temperature interval (UTI), reduces the non-recoverable creep compliance (Jnr), has an increased elastic response, has an increased load rating, has a reduced potential for permanent asphalt deformations in situations of increased traffic levels respectively reduced speeds, a good adhesion and an increased softening point as well as a decreased needle penetration.

Furthermore, a respective asphalt composition preparation process was to be provided.

The different physical properties of the asphalt composition are measured by different tests known in the art and described in detail in the experimental section.

Elastic response and non-recoverable creep compliance (Jnr) are computed in in the Multiple Stress Creep Recovery (MSCR) test in which the asphalt is subjected to a constant load for a fixed time. The total deformation for a specific period of time is given in % and correspond to a measure of the elasticity of the binder. In addition the phase angle may be measured which illustrates the improved elastic response (reduced phase angles) of the modified binder.

A Bending Beam Rheometer (BBR) is used to determine the stiffness of asphalt at low temperatures and usually refer to flexural stiffness of the asphalt. Two parameters are determined in this test: the creep stiffness is a measure of the resistance of the bitumen to constant loading, and the creep rate (or m value) is a measure of how the asphalt stiffness changes as loads are applied. If the creep stiffness is too high, the asphalt will behave in a brittle manner, and cracking will be more likely. A high m-value is desirable, as the temperature changes and thermal stresses accumulate, the stiffness will change relatively quickly. A high m-value indicates that the asphalt will tend to disperse stresses that would otherwise accumulate to a level where low temperature cracking could occur.

Accordingly, an asphalt composition was found comprising 0.1 to 10.0 wt.-% based on the total weight of the composition of a thermosetting reactive compound selected from the group consisting of polymeric MDI, epoxy resins and melamine formaldehyde resins wherein at least 18% by weight based on the total weight of the composition are particles with a sedimentation coefficient above 5000 Sved in a white spirit solvent.

According to a further aspect of the invention there is provided a process for the preparation of an asphalt composition comprising the following steps:
a) Heating up the starting asphalt to a temperature of from 110 to 190° C.

b) Adding the desired amount of thermosetting reactive compound under stirring
c) After step b) the reaction mixture is stirred at a temperature in the range of from 110 to 190° C. for at least 2.5 h wherein the reaction is under an oxygen atmosphere, which fulfills the objects of the invention. In addition there is provided the use of an asphalt composition for the preparation of an asphalt mix composition.

Surprisingly, it could be found that an asphalt composition according to the invention is showing an increased softening point combined with a decrease in needle penetration, leading to an increased useful temperature interval, an increased elastic response, a good adhesion and an increased load rating as well as a reduced potential for permanent asphalt deformations.

Without being bound to this theory it is presently believed that this is due to the amount of particles of at least 18% by weight based on the total weight of the composition having a sedimentation coefficient above 5000 Sved. A specific morphology of colloid structures is needed to obtain the resulting performances. A thermosetting reactive compound will react with the phenolic, carboxylic, thiol, anhydride and/or pyrrolic group or any reactive group from the asphalt components and link the asphaltenes together, leading to larger particles in the resulting asphalt composition.

Preferred embodiments are explained in the claims and the specification. It is understood that combinations of preferred embodiments are within the scope of the present invention.

According to the invention, the asphalt composition comprises a thermosetting reactive compound selected from the group consisting of polymeric MDI, epoxy resins and melamine formaldehyde resins.

Generally, an asphalt used in the present invention can be any asphalt known and generally covers any bituminous compound. It can be any of the materials referred to as bitumen or asphalt, For example distillate, blown, high vacuum and cut-back bitumen, and also for example asphalt concrete, cast asphalt, asphalt mastic and natural asphalt. For example, a directly distilled asphalt may be used, having, for example, a penetration of 80/100 or 180/220. For example, the asphalt can be free of fly ash.

Preferably the asphalt has a penetration of 20-30, 30-45, 35-50, 40-60, 50-70, 70-100, 100-150, 160-220, 250-330 or performance grades of 52-16, 52-22, 52-28, 52-34, 52-40, 58-16, 58-22, 58-28, 58-34, 58-40, 64-16, 64-22, 64-28, 64-34, 64-40, 70-16, 70-22, 70-28, 70-34, 70-40, 76-16, 76-22, 76-28, 76-34, 76-40, more preferably the asphalt has a penetration of 30-45, 35-50, 40-60, 50-70, 70-100, 100-150, 160-220 or performance grades of 52-16, 52-22, 52-28, 52-34, 52-40, 58-16, 58-22, 58-28, 58-34, 58-40, 64-16, 64-22, 64-28, 64-34, 70-16, 70-22, 70-28, 76-16, 76-22, most preferably the asphalt has a penetration 40-60, 50-70, 70-100, 100-150 or performance grades of 52-16, 52-22, 52-28, 52-34, 52-40, 58-16, 58-22, 58-28, 58-34, 64-16, 64-22, 64-28, 70-16, 70-22, 76-16, 76-22.

Generally, a thermosetting reactive compound is a compound which could chemically react with the different molecular species classified into asphaltenes and maltenes of the respective asphalt and helps to generate a specific morphology of colloid structures resulting in physical properties of the asphalt to remain more constant over a broad range of temperatures and/or even improve the physical properties over the temperature range the asphalt is subjected to.

The thermosetting reactive compound according to the invention is selected from the group consisting of polymeric MDI, epoxy resins and melamine formaldehyde resins.

Generally, polymeric MDI is known in the art and is known as polymethylene polyphenylene polyisocyanate and is also referred to as polyarylene polyisocyanate or polyphenylmethane polyisocyanate. It may comprises varying amounts of isomers like for example 4,4'-, 2,2'- and 2,4'-isomers. Preferably the amount of 4,4'MDI isomers is in the range of from 26% to 98%, more preferably in the range of from 30% to 95%, most preferably in the range of from 35% to 92%. Preferably the 2 rings content of polymeric MDI is in the range of from 20 to 62, more preferably in the range of from 26% to 48%, most preferably in the range of from 26% to 42%.

It can also comprise modified variants containing carbodiimide, uretonimine, isocyanurate, urethane, allophanate, urea or biuret groups. This all will be referred to in the following as pMDI. Preferably the pMDI used according to the invention has an average isocyanate functionality of at least 2.3, more preferably of at least 2.5, most preferably of at least 2.7, for example 2.8, 2.9 or 3.0.

Generally, the purity of the polymeric MDI is not limited to any value, preferably the pMDI used according to the invention has an iron content of from 1 to 100 ppm, more preferably of from 1 to 70 ppm, most preferably of from 1 to 60 ppm Generally, epoxy resins are known in the art and the chemical nature of epoxy resins used according to the present invention is not particularly limited. Preferably the epoxy resins are one or more aromatic epoxy resins and/or cycloaliphatic epoxy resins, more preferably the epoxy resins are bisphenol A bisglycidyl ether (DGEBA), bisphenol F bisglycidyl ether, ring-hydrogenated bisphenol A bisglycidyl ether, ring-hydrogenated bisphenol F bisglycidyl ether, bisphenol S bisglycidyl ether (DGEBS), tetraglycidyl-methylenedianiline (TGMDA), epoxy novolaks (the reaction products from epichlorohydrin and phenolic resins (novolak)), cycloaliphatic epoxy resins, such as 3,4-epoxy-cyclohexylmethyl 3,4-epoxycyclohexanecarboxylate and diglycidyl hexahydrophthalate, most preferably the epoxy resins are bisphenol A bisglycidyl ether and/or bisphenol F bisglycidyl ether and mixtures of these two epoxy resins.

Generally, melamine formaldehyde resins are known in the art and are mainly the condensation product of melamine and formaldehyde. Depending on the desired application they can be modified for example by reaction with polyvalent alcohols. The chemical nature of melamine formaldehyde resins used according to the present invention is not particularly limited.

Preferably the melamine formaldehyde resins relate to an aqueous melamine resin mixture with a resin content in the range of 50 to 70 weight percent, based on the aqueous melamine resin mixture, with melamine and formaldehyde present in the resin in a molar ratio of 1:3 to 1:1, more preferably with melamine and formaldehyde present in the resin in a molar ratio of 1:1.3 to 1:2.0, most preferably with melamine and formaldehyde present in the resin in a molar ratio of 1:1.5 to 1:1.7.

The melamine formaldehyde resin may contain 1 to 10 weight percent of polyvalent alcohols, preferably 3 to 6 weight percent of polyvalent alcohols, more preferably 3 to 6 weight percent of $C_2$ to $C_{12}$ diols, for example diethylene glycol, propylene glycol, butylene glycol, pentane diol and/or hexane diol, particularly diethylene glycol.

As further additives the melamine formaldehyde resins may contain 0 to 8 weight percent caprolactam and 0.5 to 10 weight percent 2-(2-phenoxyethoxy)-ethanol and/or polyethylene glycol with an average molecular mass of 200 to 1500 each based on the aqueous melamine resin mixture.

According to the invention the amount of the thermosetting reactive compound selected from the group consisting of polymeric MDI, epoxy resins and melamine formaldehyde resins in the asphalt composition is not more than 10.0 wt. % based on the total weight of the asphalt composition. Preferably not more than 5.0 wt. %, more preferably not more than 4.0 wt. %, most preferably not more than 3.0 wt. %, based on the total weight of the asphalt composition. According to the invention, the amount of the thermosetting reactive compound selected from the group consisting of polymeric MDI, epoxy resins and melamine formaldehyde resins in the asphalt composition is at least 0.1 wt. %, preferably at least 0.5 wt. %, more preferably at least 0.7 wt. %, most preferably at least 0.9 wt. % based on the total weight of the asphalt composition. For example the amount of the thermosetting reactive compound selected from the group consisting of polymeric MDI, epoxy resins and melamine formaldehyde resins in the asphalt composition can be in the range of from 0.5 wt. % to 1.8 wt. %, in the range of from 0.8 wt. % to 1.7 wt. %, in the range of from 1.0 wt. % to 1.9 wt. %, in the range of from 1.1 wt. % to 2.0 wt. %, in the range of from 1.8 wt. % to 3.2 wt. %, in the range of from 2.1 wt. % to 3.7 wt. %, or in the range of from 0.5 wt. % to 2.5 wt. %.

Generally, the amount of thermosetting reactive compound may depend on the composition of the respective asphalt. For hard asphalt having a needle penetration below 85 less thermosetting reactive compound for example pMDI may be needed and for soft asphalt having a needle penetration above 85 a larger amount of the respective thermosetting reactive compound for example pMDI may be needed. Without being bound to this theory it is presently believed that the amount of the thermosetting reactive compound needs to be readjusted due to the different concentration of asphaltene in different asphalts. In soft asphalts which corresponds to a needle penetration above 85, asphaltenes are diluted, hence lower concentrated, which require a larger amount of the respective thermosetting reactive compound for example pMDI and more oxidation, which can be supplied by the oxygen atmosphere of the preparation process of an asphalt composition, to achieve better performance.

Generally, for asphalt having a needle penetration below 85 which corresponds to a perfomance grade having a high temperature limit of at least 64, the amount of the thermosetting reactive compound selected from the group consisting of polymeric MDI, epoxy resins and melamine formaldehyde resins in the asphalt composition can be in the range of from 0.1 to 3.0 wt % preferably the amount of the thermosetting reactive compound is not more than 2.5 wt %, most preferably not more than 2.3 wt %, particularly not more than 2.0 wt % and the amount of the thermosetting reactive is at least 0.1 wt. %, preferably at least 0.5 wt. %, more preferably at least 0.7 wt. %, most preferably at least 1.0 wt. % based on the total weight of the asphalt composition.

Generally, for asphalt having a needle penetration above 85 which correspond to a perfomance grade having a high temperature limit of 64 or below, the amount of the thermosetting reactive compound selected from the group consisting of polymeric MDI, epoxy resins and melamine formaldehyde resins in the asphalt composition can be in the range of from 2.0 wt. % to 10.0 wt %, preferably the amount of the thermosetting reactive compound is not more than 5.0 wt %, most preferably not more than 4.5 wt %, particularly not more than 4.0 wt % and the amount of the thermosetting reactive is at least 2.0 wt. %, preferably at least 2.5 wt. %, more preferably at least 2.7 wt. %, most preferably at least 3.0 wt. % based on the total weight of the asphalt composition.

Generally, by modifying an asphalt the performance in terms of different physical properties may be improved for example an increased elastic response can be achieved.

By using the asphalt composition according to the invention a shift from one grade to another grade can be achieved. For example the modification of an asphalt pen 50/70 results in a polymer modified asphalt 25/55-55A using 2 wt. % of a thermosetting reactive compound or in a harder grade like a pen 20/30 or 30/45 depending on the respective amount of the respective thermosetting reactive compound. The same applies to an asphalt with a pen 70-100 being transformed to a pen 50-70 for example with 2 wt.-% of a thermosetting reactive compound or to a PmB 25/55-55A with 3 wt.-% of a thermosetting reactive compound. Also for the performance grade a shift in a higher grade is achievable for example a PG 64-22 results in a PG70-22 after modification with 2 wt.-% of the respective thermosetting reactive compound.

The properties of the asphalt composition according to the invention respectively, such as an increased softening point combined with a decrease in needle penetration, an increased useful temperature interval, an increased elastic response, a good adhesion and an increased load rating as well as a reduced potential for permanent asphalt deformations, may depend on the particle concentration with a specific sedimentation coefficient, which is directly correlated to the particle size, of the corresponding composition.

According to the invention the asphalt composition has at least 18% by weight based on the total weight of the composition particles with a sedimentation coefficient above 5000 Sved in a white spirit solvent. More preferably 20% by weight based on the total weight of the composition particles with a sedimentation coefficient above 5000 Sved in a white spirit solvent, most preferably at least 23% by weight based on the total weight of the composition particles with a sedimentation coefficient above 5000 Sved in a white spirit solvent, particles with a sedimentation coefficient above 5000 Sved in a white spirit solvent can be up to 100% by weight based on the total weight of the composition, preferably the amount of particles with a sedimentation coefficient above 5000 Sved in a white spirit solvent is not more than 95% by weight based on the total weight of the composition, more preferably not more than 90% by weight based on the total weight of the composition, most preferably not more than 80% by weight based on the total weight of the composition. For example 18% to 75% by weight based on the total weight of the composition particles with a sedimentation coefficient in the range of from 15000 to 170000 Sved in a white spirit solvent, for example 23% to 65% by weight based on the total weight of the composition particles with a sedimentation coefficient in the range of from 25000 to 140000 Sved in a white spirit solvent or for example 30% to 52% by weight based on the total weight of the composition particles with a sedimentation coefficient in the range of from 22000 to 95000 Sved in a white spirit solvent.

White spirit solvent in the context of the present invention means white spirit high-boiling petroleum with the CAS-Nr.:64742-82-1, having 18% aromatics basis and a boiling point of from 180 to 220° C.

The sedimentation coefficient was detected by ultracentrifugation combined to absorption optical devices. The sedimentation and concentration of each component were measured with a wavelength of 350 nm. This method is known in the art and described in detail in the experimental section.

The asphalt compositions of the present invention can be used as any classical asphalt compositions of the prior art. The asphalt compositions of the invention can notably be useful for the production of:
- paints and coatings, particularly for waterproofing,
- mastics for filling joints and sealing cracks
- grouts and hot-poured surfaces for surfacing of roads, aerodromes, sports grounds, etc.
- in admixture with stone to provide aggregates (comprising about 5-20% of the asphalt composition) e.g asphalt mix
- hot coatings for surfacing as above
- surface coatings for surfacing as above
- warm mix asphalt (WMA)
- hot mix asphalt (HMA)

Furthermore, the present invention relates to a process for the preparation of an asphalt composition according to the invention, comprising the following steps
a) Heating up the starting asphalt to a temperature of from 110 to 190° C.
b) Adding the desired amount of thermosetting reactive compound under stirring
c) After step b) the reaction mixture is stirred at a temperature in the range of from 110 to 190° C. for at least 2.5 h
wherein the reaction is under an oxygen atmosphere.

For example the process of the invention may be performed at a temperature of from 110 to 190° C. in step a) and or step c). Preferably the temperature is in the range of from 110 to 180° C., more preferably in the range of from 115 to 170° C., most preferably in the range of from 120 to 155° C., for example the temperature is in the range of from 121 to 152° C.

Generally the temperatures in step a), b) and step c) are in the range of from 110 to 190° C. and may differ in every step. Preferably, the temperature in every of the three steps is the same and in the range of from 110 to 190° C., more preferably the same and in the range of from 110° C. to 170° C., most preferably the same and in the range of from 110° C. to 160° C.

According to the invention in step b) of the process for the preparation of the asphalt composition, the desired amount of thermosetting reactive compound under stirring is added. The desired amount can be in the range of from 0.1 to 10 wt.-% based on the total weight of the composition.

Generally, the amount may also be determined by potentiometric titration in which the amount of reactive groups in an asphalt will be determined and correlated to the equivalent weight of reactive groups of the respective thermosetting compound. Titration methods are known in the art and are described in detail in the experimental section.

Generally, asphalt from different suppliers differ in terms of composition depending on which reservoir the crude oil is from, as well as the distillation process at the refineries. However, the cumulated total amount of reactive group can be in the range of from 3.1 to 4.5 mg KOH/g.

For example, asphalt having a penetration index of 50-70 or 70-100 result in a stoichiometric amount for pMDI to be 0.8 to 1.2% by weight. A further excess of isocyanate will be used to react with the newly formed functionalities due to oxidation sensitivity of the asphalt components under elevated temperatures during the preparation of the asphalt composition.

According to the invention the process step c) is performed after step b). The reaction mixture is stirred at a temperature in the range of from 110 to 190° C. for at least 2.5 h, preferably the mixing time is at least 3 h, more preferably the mixing time is at least 3.5 h, most preferably the mixing time is at least 4 h. The mixing time can be up to 20 h, preferably the mixing time is not more than 15 h, more preferably the mixing time is not more than 12 h, most preferably the mixing time is not more than 9 h. For example after an addition of from 1 to 1.5 wt. % of the respective thermosetting compound the mixing time may be in the range of from 2.5 h to 4 h, for example 3 h or 3.5 h. For example after an addition of from 1.5 to 5.0 wt. % of the respective thermosetting compound the mixing time may be in the range of from 4 h to 6 h, for example 4.5 h, 5 h or 5.5 h. For example after an addition of from 5 to 10.0 wt. % of the respective thermosetting compound the mixing time may be in the range of from 6 h to 15 h, for example 7 h, 7.5 h, 8 h, 8.5 h, 9 h, 9.5 h, 10 h, 10.5 h, 11 h, 11.5 h, 12 h, 12.5 h, 13 h, 13.5 h, 14 h or 14.5 h.

According to the invention the process for the preparation of an asphalt composition according to the invention, has to be performed under an oxygen atmosphere. Preferably the oxygen concentration in the oxygen atmosphere is in the range of from 1 to 21 Vol.-%, more preferably the oxygen concentration in the oxygen atmosphere is in the range of from 5 to 21 Vol.-%, most preferably the oxygen concentration in the oxygen atmosphere is in the range of from 10 to 21 Vol.-%, for example the process of the present invention is performed under air or under a saturated atmosphere of oxygen.

Generally, the process is not limited to be performed in one reaction vessel for example a container. The respective asphalt may be reacted with a thermosetting reactive compound in a first step under the conditions described above for example temperature 110° C. to 190° C. under oxygen for example for one hour. Then the asphalt can be cooled down, transferred to a different reaction vessel subsequent to the transfer heated up so that the total reaction time under oxygen is at least 2.5 h. With out to be bound by this theory it is presently believed that the steps a) and b) (the first step) is to homogenize the mixture and to induce the reaction of the reactive groups of the asphalt with the reactive groups of the respective thermosetting reactive compound. The thermosetting reactive compound may be loaded on the asphaltene surfaces. The second or additional heating steps summarized as step c) is to support cross linking reaction by oxidation.

Examples of asphalt compositions according to the invention

Z1: 1.0 to 1.8 wt.-% based on the total weight of the composition of polymeric MDI, wherein 18% to 65% by weight based on the total weight of the composition are particles with a sedimentation coefficient in the range of from 8000 to 200000 Sved in a white spirit solvent.

Z2: 1.8 to 3.2 wt.-% based on the total weight of the composition of polymeric MDI, wherein 22% to 70% by weight based on the total weight of the composition are particles with a sedimentation coefficient in the range of from 20000 to 140000 Sved in a white spirit solvent.

Z3: 1.2 to 2.2 wt.-% based on the total weight of the composition of polymeric MDI, wherein 33% to 68% by weight based on the total weight of the composition are particles with a sedimentation coefficient in the range of from 28000 to 1000000 Sved in a white spirit solvent.

Z4: 1.2 to 1.6 wt.-% based on the total weight of the composition of polymeric MDI, wherein 33% to 85% by weight based on the total weight of the composition are particles with a sedimentation coefficient in the range of from 25000 to 150000 Sved in a white spirit solvent.

Z5: 1.5 to 2.0 wt.-% based on the total weight of the composition of polymeric MDI, wherein 22% to 58% by weight based on the total weight of the composition are particles with a sedimentation coefficient in the range of from 20000 to 250000 Sved in a white spirit solvent.

Z6: 2.3 to 2.9 wt.-% based on the total weight of the composition of polymeric MDI, wherein 27% to 82% by weight based on the total weight of the composition are particles with a sedimentation coefficient in the range of from 12000 to 370000 Sved in a white spirit solvent.

Z7: 3.0 to 3.6 wt.-% based on the total weight of the composition of polymeric MDI, wherein 19% to 62% by weight based on the total weight of the composition are particles with a sedimentation coefficient in the range of from 15000 to 135000 Sved in a white spirit solvent.

Z8: 1.6 to 3.5 wt.-% based on the total weight of the composition of polymeric MDI, wherein 21% to 50% by weight based on the total weight of the composition are particles with a sedimentation coefficient in the range of from 17000 to 500000 Sved in a white spirit solvent.

Examples and Comparative Examples

General procedure for the preparation of an asphalt composition 2.5 kg of asphalt in the respective grade according to table 3 to 6 was heated up to 140° C. under oxygen atmosphere and under 400 rpm in an oil bath (temperature set up at 150° C.). When the internal temperature of 100° C. was reached, 50 g of the respective thermosetting reactive compound according to table 3 to 6 was added to the melted asphalt. The reaction is further processed at 140° C. for 420 minutes before being cooled down at room temperature. The samples were dispatched into cans for further testing and stored at room temperature.

For the comparative examples Comp1, Comp2 and Comp3 2.5 kg of asphalt with the respective grade according to table 3 to table 5 was heated up to 140° C. under oxygen atmosphere and under 400 rpm in an oil bath (temperature set up at 150° C.) for up 420 minutes before being cooled down at room temperature. The samples were dispatched into cans for further testing and stored at room temperature.

For example 3 (Ex3) 3000 g of asphalt 64-22 was heated in an oven at 150 C for 2 hours in a closed container. The preheated sample was at 150° C. and then the cover was removed and it was laced in the heating mantle under oxygen atmosphere. Under 20% mixer speed in an electric heating mantle using a temperature controller in the asphalt to hold the temperature within a delta of 2° C. of 150° C. When the internal temperature of 150° C. was reached, 60 g of pMDI with a functionality of 2.7 (As20) was added to the melted asphalt. The reaction is further processed at 150° C. for 150 Minutes. The samples were dispatched into cans before the testing started by heating them to 150° C. and separating them from the 18.91 container.

For example 4 (Ex4) 3000 g of asphalt 64-22 was heated in an oven at 150 C for 2 hours in a closed container. The preheated sample was at 150° C. and then the cover was removed and it was laced in the heating mantle under oxygen atmosphere. Under 20% mixer speed in an electric heating mantle using a temperature controller in the asphalt to hold the temperature within a delta of 2° C. of 150° C. When the internal temperature of 150° C. was reached, 60 g of pMDI with a functionality of 2.9 (As70) was added to the melted asphalt. The reaction is further processed at 150° C. for 150 minutes. The samples were dispatched into cans before the testing started by heating them to 150 C and separating them from the 18.91 container.

For the example 5 (Ex5) 2.5 kg of asphalt 70-100 was heated up to 140° C. under oxygen atmosphere and under 400 rpm in an oil bath (temperature set up at 150° C.). When the internal temperature of 100° C. was reached, 45 g of the pMDI As20 (1.8 wt.-%) was added to the melted asphalt. The reaction is further processed at 140° C. for 420 minutes before being cooled down at room temperature. The sample was then used to determine the particle parts of the asphalt composition using the analytical ultracentrifuge see in table 2.

For the comparative example Comp4 2.5 kg of asphalt 70-100 was heated up to 140° C. under oxygen atmosphere and under 400 rpm in an oil bath (temperature set up at 150° C.). When the internal temperature of 100° C. was reached, 45 g of the pMDI As20 was added to the melted asphalt. The reaction is further processed at 140° C. for 30 minutes before being cooled down at room temperature. The sample was then used to determine the particle parts of the asphalt composition using the analytical ultracentrifuge see in table 2.

For the comparative example Comp5 2.5 kg of asphalt 70-100 was heated up to 140° C. under oxygen atmosphere and under 400 rpm in an oil bath (temperature set up at 150° C.) for up 30 minutes before being cooled down to room temperature. The sample was then used to determine the particle parts of the asphalt composition using the analytical ultracentrifuge see in table 2.

Thermosetting reactive compound used in the Examples pMDI having a functionality of 2.7 named in the following As20 or having a functionality of 2.9 named in the following As70 were used.

pMDI with respective functionality are commercially available for example at the following companies: Bayer, BASF SE, Huntsmann etc.

Methods for detecting physical properties in an asphalt or an asphalt composition or asphalt mix The values of the examples are detected according to the respective DIN regulation Detailed description of the used method:

ASPHALT Tests

Needle Penetration DIN EN 1426

In this test, the penetration of a standardized needle in a bitumen test sample is measured. For penetrations under (330*0.1) [mm] the test temperature is 25 [° C.], the load 100 [g] and the loading time is 5 [s]. If penetrations above (330*0.1) [mm] are expected, the test temperature must be reduced to 15 [° C.], keeping the load and loading time unchanged.

Softening Point DIN EN 1427

Two horizontal disks of bitumen, cast in shouldered brass rings, are heated at a controlled rate in a liquid bath while each supports a steel ball. The softening point is reported as the mean of the temperatures at which the two disks soften enough to allow each ball, enveloped in bitumen, to fall a distance of (25±0.4) [mm].

Force Ductility DIN EN 13589

Bitumen is casted to a mold which has rings on both ends. After the specimen is tempered in a water bath, it's attached by the rings in the clips of a ductilimeter. The specimen is pulled, in a water bath at a previously defined temperature (in this case 20 [° C.]), at a 50 [mm/min] until it breaks or until it reaches at least 400 [mm]. The force and deformation are measured throughout the entire test.

Rolling Thin Film Oven Test DIN EN 12607-1

Bitumen is heated in bottles in an oven for 85 [min] at 163 [° C.]. The bottles are rotated at 15 [rpm] and heated air is blown into each bottle at its lowest point of travel at 4000 [mL/min]. The effects of heat and air are determined from changes in physical test values as measured before and after the oven treatment.

Pressure Aging Vessel DIN EN 14769

The residue from the RTFOT is placed in standard stainless steel pans and aged at a specified conditioning temperature (90 [° C.], 100 [° C.] or 110 [° C.]) for 20 [h] in a vessel pressurized with air to 2.10 [MPa]. The temperature is selected according to the grade of the asphalt binder (application). Finally, the residue is vacuum degassed.

Dynamic Shear Rheometer (DSR) DIN EN 14770-ASTM D7175

A dynamic shear rheometer test system consists of parallel plates, a means for controlling the temperature of the test specimen, a loading device, and a control and data acquisition system.

Temperature Sweep DIN EN 14770

This test has the objective of measuring the complex shear modulus and phase angle of asphalt binders. The test consists in pressing an 8 or 25 [mm] diameter test specimen between parallel metal plates at a defined frequency and temperature. One of the parallel plates is oscillated with respect to the other at, in this case, 1.59 [Hz] and angular deflection amplitudes. The required amplitudes must be selected so that the testing is within the region of linear behavior. This is repeated at 30, 40, 50, 60, 70, 80 and 90 [° C.].

Multiple Stress Creep Recovery Test DIN EN 16659-ASTM D7405

This test method is used to determine the presence of elastic response in an asphalt binder under shear creep and recover at two stress level (0.1 and 3.2 [kPa]) and at a specified temperature (50 [° C.]). This test uses the DSR to load a 25 [mm] at a constant stress for 1 [s], and then allowed to recover for 9 [s]. Ten creep and recovery cycles are run at 0.100 [kPa] creep stress followed by ten cycles at 3.200 [kPa] creep stress.

Bending Beam Rheometer DIN EN 14771-ASTM D6648

This test is used to measure the mid-point deflection of a simply supported prismatic beam of asphalt binder subjected to a constant load applied to its mid-point. A prismatic test specimen is placed in a controlled temperature fluid bath and loaded with a constant test load for 240 [s]. The test load (980±50 [mN]) and the mid-point deflection of the test specimen are monitored versus time using a computerized data acquisition system. The maximum bending stress at the midpoint of the test specimen is calculated from the dimensions of the test specimen, the distance between supports, and the load applied to the test specimen for loading times of 8.0, 15.0, 30.0, 60.0, 120.0 and 240.0 [s]. The stiffness of the test specimen for the specific loading times is calculated by dividing the maximum bending stress by the maximum bending strain.

Asphalt Mix Tests

Cyclic Compression Test—TP Asphalt-StB Tell 25 B1

The Uniaxial Cyclic compression test is used to determine the deformation behavior of asphalt specimens. In this test, the specimen is tempered for (150±10) [min] at (50±0.3) [° C.], which is the same temperature at which the test is conducted. After the tempering period, the specimen is set on the universal testing machine and loaded cyclically. Each cycle lasts 1.7 [s], where the loading time is 0.2 [s] and the pause lasts 1.5 [s]. The upper load applied is 0.35 [MPa] and the lower one is 0.025 [MPa]. The number of cycles and the deformation are registered. The test ends either when 10.000 load cycles are completed or when the deformation is higher than 40%.

Indirect Tensile Strength Test—TP Asphalt-StB Teil 23

The indirect tensile strength test of bituminous mixtures is conducted by loading a cylindrical specimen across its vertical diametral plane at a specified rate (in this case 50±02 [mm/min]) of deformation and test temperature (in this case 15±2 [° C.]). The peak load at failure is recorded and used to calculate the indirect tensile strength of the specimen.

Potentiometric titration method for determining reactive groups in an asphalt:

Acid Value

Approx. 0.5-1 g sample was dissolved in 50 ml toluene and titrated potentiometrically with 0.1 mol/l tetrabutylammonium hydroxide solution. A few drops of water can be added to the titration solution to ensure sufficient conductivity. A blank value was determined as well.

Base Value

Approx. 0.5-1 g sample was dissolved in 50 ml toluene and titrated potentiometrically with 0.1 mol/l trifluoromethane sulfonic acid solution. A few drops of water can be added to the titration solution to ensure sufficient conductivity. A blank value was determined as well.

Determination of the particle parts of the asphalt composition using the analytical ultracentrifuge (AUC)

For the determination of the particle parts of the asphalt composition, fractionation experiments using analytical ultracentrifugation were conducted. Sedimentation velocity runs using a Beckman Optima XL-I (Beckman Instruments, Palo Alto, USA) were performed. The integrated scanning UVNIS absorbance optical system was used. A wavelength of 350 nm was chosen. The samples have been measured at a concentration of about 0.2 g/L after dilution in a white spirit solvent (CAS-Nr.:64742-82-1). In order to detect the soluble and insoluble parts, the centrifugation speed was varied between 1000 rpm and 55,000 rpm.

The distribution of sedimentation coefficients, defined as the weight fraction of species with a sedimentation coefficient between s and s+ds, and the concentration of one sedimenting fraction were determined using a standard analysis Software (SEDFIT). The change of the whole radial concentration profile with time was recorded and converted in distributions of sedimentation coefficient g(s). The sedimentation coefficient is in units of Sved (1 Sved=10-13 seconds). The particle parts of the asphalt composition were determined by quantifying the light absorption of the fast and slow sedimenting fractions at the used wavelength.

TABLE 1

Results of particle parts determination of asphalt composition of example 1 (Ex1) and the comparative example (Comp1) using the analytical ultracentrifuge, the concentration is particles in wt.-% based on the total weight of the respective composition.

| Samples | Composition by N = 50000 U/min | | Composition by N = 3000 U/min | |
| --- | --- | --- | --- | --- |
| | S50 [Sved] | Concentration [wt.-%] | S50 [Sved] | Concentration [wt.-%] |
| Comp 1 | 0.7 | 85 | 41784 | 15 |
| Ex 1 | 0.8 | 60 | 49341 | 40 |

TABLE 2

Results of particle parts determination of asphalt composition of example 5 (Ex5) and the comparative examples Comp2, Comp4 and Comp5 using the analytical ultracentrifuge, the concentration is particles in wt.-% based on the total weight of the respective composition.

| Samples | Komponente bei N = 50000 U/min | | Komponente bei N = 1500 U/min | |
| --- | --- | --- | --- | --- |
| | $S_{50}$ [Sved] | Konz. [wt %] | $S_{50}$ [Sved] | Konz. [wt %] |
| Comp 4 | 0.5 | 86% | 89693 | 14% |
| Ex5 | 0.5 | 75% | 149997 | 25% |
| Comp 5 | 0.6 | 90% | 157935 | 10% |
| Comp 2 | 0.6 | 88% | 109973 | 12% |

TABLE 3

Asphalt compositions of example 1 to 2 and of the comparative examples Comp1 to Comp2, physical properties of the asphalt compositions after preparation, stiffness and m-value without aging.

| | | fresh | | | | | |
| --- | --- | --- | --- | --- | --- | --- | --- |
| Example | asphalt | thermosetting reactive compound | dosage (wt %) of thermosetting reactive compound | Softening point (° C.) | Needle penetration (1/10 mm) | MSCR after RTFOT @ 0.1 kPa (%) | MSCR after RTFOT@ 3.2 kPa (%) |
| Comp 1 | pen 50/70 | — | 0 | 53.6 | 38 | 9 | 5 |
| Ex 1 | pen 50/70 | As20 | 2 | 66 | 20 | 45 | 29 |
| Comp 2 | pen 70/100 | — | 0 | 47.7 | 60 | 1.9 | −1.4 |
| Ex 2 | pen 70/100 | As20 | 2 | 52.6 | 45 | 17.1 | 1.4 |

| | | fresh | | | |
| --- | --- | --- | --- | --- | --- |
| Example | Force ductility | Phase angle [°] | Stiffness by −10° C. [MPa] | Stiffness by −25° C. [MPa] | m-value by −10° C. | m-value by −25° C. |
| Comp 1 | 6.7 | 72 | 69.2 | — | 0.418 | — |
| Ex 1 | 22 | 59.5 | 80.05 | — | 0.376 | — |
| Comp 2 | 1.9 | 80.8 | 66 | 420 | 0.458 | 0.216 |
| Ex 2 | 3.8 | 74.2 | 69.1 | 444.5 | 0.436 | 0.208 |

TABLE 4

Asphalt compositions of example 1 to 2 and of the comparative examples Comp1 to Comp2, softening point of the fresh asphalt compositions after preparation and stiffness and m-value after short time aging using the Rolling Thin Film Oven Test (RTFOT).

| | | fresh | | RTFOT | | | |
| --- | --- | --- | --- | --- | --- | --- | --- |
| Example | asphalt | thermosetting reactive compound | dosage (wt %) of thermosetting reactive compound | Softening point (° C.) | Stiffness by −10° C. [MPa] | Stiffness by −25° C. [MPa] | m-value by −10° C. | m-value by −25° C. |
| Comp 1 | pen 50/70 | — | 0 | 53.6 | 83.4 | 536.3 | 0.38 | 0.213 |
| Ex 1 | pen 50/70 | As20 | 2 | 66 | 88.7 | — | 0.356 | — |
| Comp 2 | pen 70/100 | — | 0 | 47.7 | 78 | 455.7 | 0.43 | 0.214 |
| Ex 2 | pen 70/100 | As20 | 2 | 52.6 | 79.7 | 459.7 | 0.409 | 0.217 |

TABLE 5

Asphalt compositions of example 3 to 4 and of the comparative example Comp3, physical properties of the asphalt compositions after preparation, useful temperature interval detected according to AASHTO M320 and respective resulting asphalt grade.

| Example | asphalt | thermosetting reactive compound | dosage (wt %) of thermosetting reactive compound | Softening point (° C.) | MSCR after RTFOT @ 0.1 kPa (%) | MSCR after RTFOT@ 3.2 kPa (%) | UTI [° C.] | Grading |
|---|---|---|---|---|---|---|---|---|
| Comp 3 | PG 64-22 | — | 0 | 48.4 | 5.4 | 1.2 | 91 | 64-22 |
| Ex 3 | PG 64-22 | As20 | 2 | 54.5 | 49.1 | 36.4 | 95.1 | 75-20 |
| Ex 4 | PG 64-22 | As70 | 2 | 54.8 | 57.9 | 46.7 | 97.5 | 76-22 |

TABLE 6

Asphalt compositions of example 6 to 7 and of the comparative example Comp3, physical properties of the asphalt compositions after preparation, useful temperature interval detected according to AASHTO M320 and respective resulting asphalt grade.

| Example | Additive | Dosage wt. % | M320 PG Grade ° C. | Continuous Grade ° C. | UTI ° C. | ΔT ° C. |
|---|---|---|---|---|---|---|
| Comp 3 | Unmodified | 0 | 64-22 | 66.7-24.3 | 91.0 | 0.0 |
| Ex 6 | As20 | 1 | 70-22 | 71.6-23.6 | 95.2 | 4.2 |
| Ex 7 | As20 | 3 | 70-16 | 75.8-18.7 | 94.5 | 3.5 |

The asphalt modification according to the invention is leading to an improved performance with an increase of the softening point and decrease of the needle penetration. For hard grades asphalts such modification is more pronounced than for softer grades. By making the starting asphalt harder, elastic behavior is improved as can be seen in the MSCR results as well as the phase angle shift. The materials are in general getting stiffer at low temperature compared to unmodified asphalt detected by a slight increase of the creep stiffness, at the same time the m-value is diminishing. To determine if the modified asphalt may crack earlier, short time aging was performed and the creep stiffness as well as the creep rate were measured. After RTFOT (short time aging), creep stiffness of the modified asphalt at −10° C. and at −25° C. are not increasing as much as for the unmodified asphalt. The m value at −25° C. for the modified pen 70-100 is increasing.

Results for Asphalt Mix:
Preparation of the asphalt mix specimens:
The granulometric curve chosen was a SMA 8 S.

TABLE 7

Mass percentage in view of different Aggregate size in [mm].

| | Aggregate Size [mm] | | | | | | |
|---|---|---|---|---|---|---|---|
| | ≤0.063 | 0.063 | 0.125 | 0.71 | 2 | 5.6 | 8 | 11.2 |
| [M.-%] | 9.2 | 3.3 | 6.6 | 6.6 | 19.3 | 49.3 | 5.9 | 0.0 |
| Pass [M.-%] | — | 9.2 | 12.4 | 19.0 | 25.6 | 44.9 | 94.1 | 100.0 |

The material designation of the stone aggregate chosen to prepare the specimen were:

TABLE 8

Material designation of aggregate and grade.

| Designation | Delivered Grade |
|---|---|
| Limestone | Filler - 0/0.063 |
| Basanite | Fine Aggregate - 0/2 |
| Diabase | Coarse Aggregate - 2/5 |
| Diabase | Coarse Aggregate - 5/8 |

For the preparation of asphalt mixes the TP Asphalt-StB Part 35 norm was used. The following procedure was carried out:

Tempering of the Components

The respective aggregates listed in table 8 were tempered for 8 [h], at 150° C.±5 [° C.] For example Ex10 the asphalt pen 50-70 was heated up to 150° C. under oxygen atmosphere under stirring. When the internal temperature of 150° C. was reached, 2 wt.-% of pMDI As20 was added to the melted asphalt. The reaction is further processed at 150° C. for 5 h and then the modified asphalt is sealed, at 150° C.±5 [° C.]. For comparative example Comp6 the asphalt pen 50-70 was heated up to 150° C. under oxygen atmosphere under stirring. The reaction is further processed at 150° C. for 5 h and then the asphalt is sealed, at 150° C.±5 [° C.].

Mixing the Components

At a temperature of 150° C.±5 [° C.] the stone mastic asphalt is mixed in the following order: 1. Coarse aggregate, 2. Filler with crushed sand, 3.-Fiber, 4.-Dry mix for 2 [min], 5.-Previously stir the respective asphalt or modified asphalt and then add to the mixture, 6.-Mix for 3 [min] at 30 [rpm].

Storage

After mixing, the mixture is stored for a maximum of 3 [h] at 10 [° C.] above the compaction temperature.

Production and Compaction of the Test Specimens

For the production and compaction of the specimens, the TP Asphalt-StB Part 33 norm was used.

This norm explains the procedure to produce test specimen in the laboratory with the rolling compaction machine (Walzsektor-Verdichtungsgerat).

To prepare the test specimen, the hot mixed asphalt mixture was poured in plates and compacted with the help of the rolling compaction machine. The plates are 320 [mm] long, 260 [mm] wide and at least 40 [mm] high. The height of the plates depends on the specimen dimensions required for a specific test.

To compact the plates, the equipment (machine, mold and press) must be tempered at 80 [° C.], while the mixtures temperature during the compaction comply with the following (table 9).

TABLE 9

Overview of compacting temperature and storage temperature of mixture.

| Compaction temperature during the production | Storage temperature of the Mixture |
|---|---|
| 135 ± 5 [° C.] for normal bitumen (according to the TL Bitumen-StB) | 145 ± 5 [° C.] for max. 3 [h] |
| 145 ± 5 [° C.] for PmB (according to the TL Bitumen-StB) | 155 ± 5 [° C.] for max. 3 [h] |

Sawing of the Test Specimens

After the production of the plates, these must be sawed in the required dimensions. The dimensions depend on the test. The specimen dimensions required for the different test are the following (table 10)

TABLE 10

Size and number of test specimens depending on the asphalt test.

| Asphalt Test | DIN EN | TP Asphalt-StB | Minimum Test Specimens | Test Specimen Dimensions |
|---|---|---|---|---|
| Deformation Behaviour | | | | |
| Cyclic Compression Test | 12697-25 | Teil 25 B1 | 3 | φ: 100 - H: 60 |
| Fatigue Behaviour | | | | |
| Cyclic Indirect Tensile Strength Test | | AL - Sp-Asphalt 09 | 10 | φ: 100 - H: 40 |

Physical properties of asphalt mix based on pMDI modified asphalt pen 50-70 according to Ex1.

Uniaxial Cyclic Compression Test (T=50[° C.]–σ=0.35 [MPa])

The test determines the deformation behavior of an asphalt mix due to a cyclic compression load. The value of interest is the inflection point where the deformation turns from a constant deformation rate, to a progressive deformation.

TABLE 11

Asphalt Mix compositions of example 10 (Ex10) and of the comparative example Comp6, results for nw: Load cycles at inflection point and εw: Deformation at inflection point.

| Variant | nw | εw |
|---|---|---|
| Comp6 | 1.002 | 3.3785 |
| Ex10 | 3.307 | 3.5792 |

The modification of the asphalt with pMDI leads to an asphalt mix (Ex10) in which the inflection point is moved to the right to nw: 3307 as compared to nw: 1002 for the unmodified asphalt mix of Comp6. The number of load cycles increased drastically after modification.

Cyclic Indirect Tensile Strength Test

This test is used to study the fatigue behavior of asphalt mixes. A cylindric test specimen is loaded vertically in the vertical diametral plane. The specimens are loaded with different loads, previously determined.

TABLE 12

Asphalt Mix compositions of example 10 (Ex10) and of the comparative example Comp6 showing results of cyclic indirect tensile strength test.

| Upper Stress [MPa] | Comp6 Loading Cycles | Ex10 Loading Cycles |
|---|---|---|
| 0.3 | 3.766 | 18.930 |
| 0.4 | 1.586 | 8.169 |
| 0.6 | 770 | 1.454 |

The modified asphalt mix Ex10 can stand more load compared to the unmodified asphalt mix of Comp6 as can be evidenced by the higher number of loading cycles. The test prove the superior elastic behavior of the modified asphalt composition according to the invention and the resulting modified asphalt mix composition.

The invention claimed is:

1. An asphalt composition comprising 0.1 to 10.0 wt.-% based on the total weight of the composition of a thermosetting reactive compound selected from the group consisting of polymeric MDI, epoxy resins and melamine formaldehyde resins, wherein at least 18% by weight based on the total weight of the composition are particles with a sedimentation coefficient above 5000 Sved in a white spirit solvent.

2. The asphalt composition according to claim 1, wherein above 20% by weight based on the total weight of the composition are particles with a sedimentation coefficient in a range of from 10000 to 1000000 Sved in a white spirit solvent.

3. The asphalt composition according to claim 1, wherein the thermosetting reactive compound is polymeric MDI and the polymeric MDI has a functionality of at least 2.5.

4. The asphalt composition according to claim 1, wherein the amount of polymeric MDI is of from 0.5 to 2.0 wt.-% based on the total weight of the composition.

5. The asphalt composition according to claim 1, wherein the amount of polymeric MDI is of from 2.0 to 5.0 wt.-% based on the total weight of the composition.

6. The asphalt composition according to claim 1, wherein the polymeric MDI has a functionality of at least 2.7.

7. The asphalt composition according to claim 1, wherein the polymeric MDI has iron content in the range of from 1 to 80 ppm.

8. A process for the preparation of the asphalt composition according to claim 1 comprising the following steps:
   a) Heating up the starting asphalt to a temperature of from 110 to 190° C.
   b) Adding the desired amount of thermosetting reactive compound under stirring
   c) After step b) the reaction mixture is stirred at a temperature in the range of from 110 to 190° C. for at least 2.5 h
   wherein the reaction is under an oxygen atmosphere.

9. The process according to claim 8, wherein the temperature is in the range of from 110 to 150° C.

10. The process according to claim 8, wherein the temperature in step a) and step c) are the same and in the range of from 110 to 150° C.

11. The process according to claim 8, wherein the temperature is in the range of from 110 to 150° C. and the reaction mixture is stirred for at least 4 h after the addition step b).

12. The process according to claim 8 wherein the end of the reaction is determined by IR spectroscopy.

13. An asphalt mix composition which comprise the asphalt composition according to claim 1 and stone.

14. A process for the preparation of an asphalt mix composition which comprises mixing the asphalt composition according to claim 1 with stone.

\* \* \* \* \*